(12) United States Patent
Park et al.

(10) Patent No.: US 8,847,557 B2
(45) Date of Patent: Sep. 30, 2014

(54) MOBILE TERMINAL AND USB DEDICATED CHARGER DETERMINING METHOD THEREOF

(75) Inventors: Jonghyun Park, Gyeonggi-Do (KR); Janggeun Oh, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 706 days.

(21) Appl. No.: 13/181,714

(22) Filed: Jul. 13, 2011

(65) Prior Publication Data

US 2012/0043927 A1 Feb. 23, 2012

(30) Foreign Application Priority Data

Aug. 23, 2010 (KR) ........................ 10-2010-0081668

(51) Int. Cl.
  *H02J 7/00* (2006.01)
  *H02J 7/02* (2006.01)
  *H02J 7/04* (2006.01)
(52) U.S. Cl.
  CPC ...... *H02J 7/027* (2013.01); *H02J 7/045* (2013.01)
  USPC ........... 320/137; 320/107; 320/153; 320/162; 320/164; 713/300; 713/340
(58) Field of Classification Search
  CPC ................................. H02J 7/00; H02J 7/0073
  USPC .................................................. 320/107, 137
  See application file for complete search history.

(56) References Cited

U.S. PATENT DOCUMENTS

| | | | | |
|---|---|---|---|---|
| 5,150,031 | A * | 9/1992 | James et al. ................... | 320/164 |
| 5,402,055 | A | 3/1995 | Nguyen | |
| 5,498,950 | A | 3/1996 | Ouwerkerk | |
| 7,581,119 | B2 * | 8/2009 | Tupman et al. ............... | 713/300 |
| 7,649,342 | B2 * | 1/2010 | Hajiaghajhani ............... | 320/153 |
| 7,853,818 | B2 * | 12/2010 | Nguyen ........................ | 713/340 |
| 8,242,750 | B2 * | 8/2012 | Li et al. .......................... | 320/137 |
| 2003/0117112 | A1 * | 6/2003 | Chen et al. ..................... | 320/137 |
| 2006/0015757 | A1 | 1/2006 | Tupman et al. | |
| 2009/0267569 | A1 * | 10/2009 | Bayne et al. .................. | 320/137 |
| 2009/0267571 | A1 * | 10/2009 | Wolf et al. .................... | 320/162 |
| 2009/0295339 | A1 * | 12/2009 | Wong ............................. | 320/162 |
| 2010/0066311 | A1 * | 3/2010 | Bao et al. ...................... | 320/162 |
| 2010/0070659 | A1 | 3/2010 | Ma et al. | |
| 2010/0205472 | A1 * | 8/2010 | Tupman et al. ............... | 713/340 |

FOREIGN PATENT DOCUMENTS

CN 1897398 A 1/2007

* cited by examiner

*Primary Examiner* — Edward H Tso
*Assistant Examiner* — Jerry D Robbins
(74) *Attorney, Agent, or Firm* — Birch, Stewart, Kolasch & Birch, LLP

(57) ABSTRACT

A method of determining a charger of a mobile terminal, and which includes receiving, via a controller of the mobile terminal, a connection signal indicating the charger is connected to the mobile terminal; setting, via the controller, a charging current of the charger for charging the mobile terminal and increasing the set charging current in predetermined current units; measuring, via the controller, an actual current received from the charger and applied to the mobile terminal; comparing, via the controller, the set charging current with the measured actual current; determining, via the controller, a charging sector of the charger when the set charging current is larger than the measured actual current for a first predetermined amount of time; and calculating a charging current capacity of the charger using the determined charging sector.

18 Claims, 10 Drawing Sheets

MOBILE TERMINAL AND USB DEDICATED CHARGER DETERMINING METHOD THEREOF

Pursuant to 35 U.S.C. §119, this application claims the benefit of Korean Application No. 10-2010-0081668, filed on Aug. 23, 2010, the entire contents of which are hereby incorporated by reference herein in their entirety.

BACKGROUND OF THE INVENTION

1. Field of the Invention

This present application relates to a mobile terminal and corresponding method for determining a proper charging current according to a charging capacity of a dedicated charger.

2. Background of the Invention

A mobile terminal can perform various functions such as video and voice call communications, capturing still or moving images using a camera, recording voice data, reproducing music files through a speaker system, displaying image or video, playing games, viewing video or TV broadcast programs, etc. Thus, the mobile terminal functions as a multimedia player. Mobile terminals also may include a touch function and graphical user interface (GUI) allowing the user to easily input information into the mobile terminal. The mobile terminal can also be charged using a variety of chargers. For example, the user can use a travel adaptor (TA) to charge their mobile terminal with a current of 700 mA or 800 mA through a USB cable. However, the related art charger is often not sufficient to meet the user's demands.

For example, many users now have smart phones, which combine many traditional personal computer features with calling features. However, the smart phone requires more battery capacity. An amount of time needed to charge the phone is also often too long. More concretely, when a battery having a charging capacity less than 1000 mA is used, a TA of 700 mA is used (substantially, 600 mA). On the other hand, when a battery having a charging capacity more than 1000 mA is used, a TA of 1 A is used (substantially, 800 mA or 900 mA).

Manufacturers are also developing the TA of 1 A to reduce a charging time. In this instance, the TA of 700 mA needs to be distinguished from the TA of 1 A. The only method for distinguishing the TA of 700 mA from the TA of 1 A is to check an ID resistance of a USB cable which connects the TA to the mobile terminal. This method is used to determine the TA type having a predetermined capacity and includes checking an inner resistance of a USB plug coupled to a receptacle of the mobile terminal when the TA is connected to the mobile terminal through the USB cable.

For example, when the inner resistance of the USB plug is 180KΩ, the method determines that the TA of 700 mA is connected to the mobile terminal. On the other hand, when the inner resistance of the USB plug is 220KΩ, the method determines that the TA of 1 A is connected to the mobile terminal. A charging operation is then performed for charging the mobile terminal with a current set according to the determined TA type.

Many problems occur in the related art when charging the mobile terminal, because there is no effective method for detecting the charging capacity of the TA. For example, one problem occurs when the mobile terminal is charged using a USB type TA of a small capacity. In this instance, the TA overloads causing explosions. For instance, when a smart phone preset to be charged using the TA of 1 A is to be charged using TA of 700 mA, the mobile terminal tends to supply a charging capacity of 1 A to a battery. As a result, an overload occurs on the TA. Further, the TA is often damaged when an over current protection is applied to the TA.

In addition, when connecting the TA of 700 mA to the mobile terminal through a USB cable of 220KΩ, a controller of the mobile terminal determines that the TA of 1 A is currently connected to the mobile terminal. Then, the controller sets a charging current as 800 mA to perform a charging operation. The mobile terminal also tends to supply a charging capacity of 800 mA to a battery. As a result, an overload can occur on the TA, and thus the TA may be damaged.

SUMMARY OF THE INVENTION

Accordingly, one object of the present invention is to address the above-noted and other problems of the related art.

Another object of the present invention is to provide a mobile terminal and corresponding method for rapidly and precisely calculating a charging current suitable for a charging capacity of a charger.

Yet another object of the present invention is to provide a mobile terminal and corresponding method for preventing damages of a charger by effectively checking a charging capacity of the charger connected to the mobile terminal.

To achieve these and other advantages and in accordance with the purpose of this specification, as embodied and broadly described herein, the present invention provides in one aspect a method of determining a charger of a mobile terminal, and which includes receiving, via a controller of the mobile terminal, a connection signal indicating the charger is connected to the mobile terminal; setting, via the controller, a charging current of the charger for charging the mobile terminal and increasing the set charging current in predetermined current units; measuring, via the controller, an actual current received from the charger and applied to the mobile terminal; comparing, via the controller, the set charging current with the measured actual current; determining, via the controller, a charging sector of the charger when the set charging current is larger than the measured actual current for a first predetermined amount of time; and calculating a charging current capacity of the charger using the determined charging sector.

In another aspect, the present invention provides a mobile terminal including a wireless communication unit configured to wirelessly communicate with at least one other entity; an interface configured to receive a connection signal indicating a charger is connected to the mobile terminal; and a controller configured to set a charging current of the charger for charging the mobile terminal and increase the set charging current in predetermined current units, to measure an actual current received from the charger and applied to the mobile terminal, to compare the set charging current with the measured actual current, to determine a charging sector of the charger when the set charging current is larger than the measured actual current for a first predetermined amount of time, and to calculate a charging current capacity of the charger using the determined charging sector.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure. In the drawings.

DETAILED DESCRIPTION OF THE INVENTION

Hereinafter, a mobile terminal associated with the present invention will be described in more detail with reference to the accompanying drawings. A terminal can be implemented in various forms. A terminal disclosed herein may include mobile terminals such as a portable phone, a smart phone, a laptop computer, a digital broadcast terminal, a personal digital assistant (PDA), a portable multimedia player (PMP), a navigation system, and the like and stationary terminals such as a digital TV, a desktop computer, and the like. In the following description, it is assumed and described that the terminal is a mobile terminal. However, a configuration according to the following description may be applicable to the stationary terminal excluding constituent elements particularly configured for mobile purposes.

Figure 1:
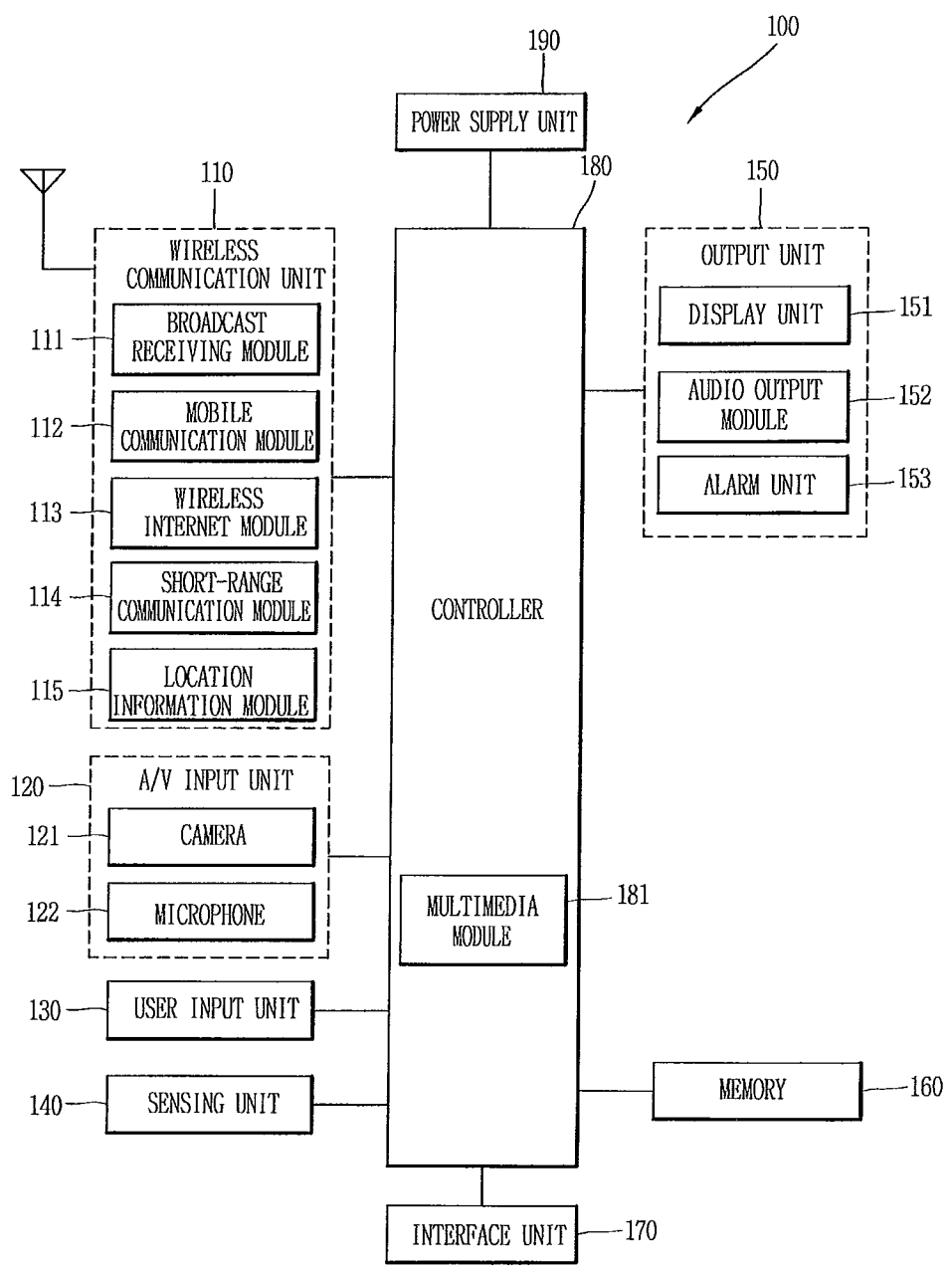
FIG. 1 is a block diagram of a mobile terminal according to an embodiment of the present invention.

Turning first to FIG. 1, which is a block diagram illustrating a mobile terminal 100 associated with an embodiment of the present invention. In the embodiment in FIG. 1, the mobile terminal 100 includes a wireless communication unit 110, an Audio/Video (A/V) input unit 120, a user input unit 130, a sensing unit 140, an output unit 150, a memory 160, an interface unit 170, a controller 180, a power supply unit 190, and the like. FIG. 1 also illustrates the mobile terminal 100 having various constituent elements. However, the constituent elements as illustrated in drawing are not necessarily required, and the mobile terminal may be implemented with greater or less number of elements than those illustrated elements.

In addition, the wireless communication unit 110 includes one or more modules allowing radio communication between the mobile terminal 100 and a wireless communication system, or allowing radio communication between radio communication the mobile terminal 100 and a network in which the mobile terminal 100 is located. For example, in FIG. 1, the wireless communication unit 110 includes a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. Further, the broadcast management server corresponds to a server that generates and transmits a broadcast signal and/or broadcast associated information or a server that receives a previously generated broadcast signal and/or broadcast associated information and transmits to the mobile terminal 100. The broadcast associated information includes information regarding a broadcast channel, a broadcast program, a broadcast service provider, and the like. The broadcast signal may include a TV broadcast signal, a radio broadcast signal and a data broadcast signal as well as a broadcast signal in a form that a data broadcast signal is combined with the TV or radio broadcast signal.

On the other hand, the broadcast associated information may also be provided through a mobile communication network, and in this instance, the broadcast associated information may be received by the mobile communication module 112. In addition, the broadcast associated information may exist in various forms such as in the form of an electronic program guide (EPG) of the digital multimedia broadcasting (DMB) system, an electronic service guide (ESG) of the digital video broadcast-handheld (DVB-H) system, and the like.

The broadcast receiving module 111 can also receive a broadcast signal using various types of broadcast systems. In particular, the broadcast receiving module 111 can receive a digital broadcast signal using a digital broadcast system such as the digital multimedia broadcasting-terrestrial (DMB-T) system, the digital multimedia broadcasting-satellite (DMB-S) system, the media forward link only (MediaFLO) system, the digital video broadcast-handheld (DVB-H) system, the integrated services digital broadcast-terrestrial (ISDB-T) system, and the like. The broadcast receiving module 111 can also be configured to be suitable for all broadcast systems that provide a broadcast signal as well as the above-mentioned digital broadcast systems.

In addition, the broadcast signal and/or broadcast-associated information received through the broadcast receiving module 111 may be stored in the memory 160. The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

Further, the wireless Internet module 113 includes a module for supporting wireless Internet access. The wireless Internet module 113 may be built-in or externally installed to the mobile terminal 100, and can use a wireless Internet access technique including a WLAN (Wireless LAN), Wi-Fi, Wibro (Wireless Broadband), Wimax (World Interoperability for Microwave Access), HSDPA (High Speed Downlink Packet Access), and the like. The short-range communication module 114 is a module for supporting a short-range communication, and can use a short-range communication technology including Bluetooth, Radio Frequency IDentification (RFID), Infrared Data Association (IrDA), Ultra WideBand (UWB), ZigBee, and the like.

In addition, the location information module 115 is a module for checking or acquiring a location of the mobile terminal 100, and corresponds to a Global Positioning System (GPS) module as a representative example. The GPS module calculates spaced-apart distance information and accurate time information from three or more satellites and then applies trigonometry to the calculated information, thereby accurately calculating current position information based on latitude, longitude, and height. The GPS module can use a method of calculating position and time information using three satellites and correcting an error of the calculated position and time information using another satellite. Furthermore, the GPS module can calculate speed information by continuously calculating a current position in real time.

In addition, the A/V (audio/video) input unit 120 receives an audio or video signal and includes a camera 121 and a microphone 122. The camera 121 processes an image frame, such as a still picture or video, obtained by an image sensor in a video phone call or image capturing mode. The processed image frame may be displayed on a display unit 151. The image frames processed by the camera 121 may also be stored in the memory 160 or transmitted to the outside through the wireless communication unit 110. Two or more cameras 121 may also be provided according to the use environment of the mobile terminal.

The microphone 122 receives an external audio signal through a microphone in a phone call mode, a recording mode, a voice recognition mode, and the like, and processes the audio signal into electrical voice data. The processed voice data is then converted and output into a format that is transmittable to a mobile communication base station through the mobile communication module 112 in the phone call mode. The microphone 122 may also implement various types of noise canceling algorithms to cancel noise generated in a procedure of receiving the external audio signal.

Further, the user input unit 130 can be used to generate input data to control an operation of the terminal. The user input unit 130 may include a keypad, a dome switch, a touch pad (pressure/capacitance), a jog wheel, a jog switch, and the like. Particularly, when the touch pad forms an interlayer structure together with the display unit 151, the interlayer structure is referred to as a touch screen.

In addition, the sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, the sensing unit 140 can sense an opened or closed state of the slide phone. The sensing unit 140 also takes charge of a sensing function associated with whether or not power is supplied from the power supply unit 190, or whether or not an external device is coupled to the interface unit 170. The sensing unit 140 can also include a proximity sensor.

Furthermore, the sensing unit 140 may include a magnetic field sensor for calculating the direction of movement when the user moves, a gyro sensor for calculating the direction of rotation, and an acceleration sensor for multiplying the user's stride by the number of strides to calculate the distance of movement.

In addition, the interface unit 170 performs a role of interfacing with external devices connected to the mobile terminal 100. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. In addition, the identification module may be configured as a chip for storing various information used to authenticate an authority for using the mobile terminal 100, which may include a User Identity Module (UIM), a Subscriber Identity Module (SIM) and the like. Also, the device provided with the identification module (hereinafter, referred to as 'identification device') may be implemented in the type of a smart card. Hence, the identification device can be coupled to the mobile terminal 100 via a port.

The interface unit 170 can also receive data or power from an external device and transfer the received data or power to each constituent element in the mobile terminal 100, or transmit data within the mobile terminal 100 to the external device. Also, the interface unit 170 may serve as a path for power to be supplied from an external cradle to the mobile terminal 100 when the portable terminal 100 is connected to the external cradle, or as a path for transferring various command signals input from the cradle by the user to the mobile terminal 100. Such various command signals or power input from the cradle may be operated as signals for recognizing that the mobile terminal 100 has accurately been mounted on the cradle.

In addition, the output unit 150 is configured to provide an output for audio signal, video signal, or alarm signal, and in FIG. 1, includes the display unit 151, an audio output module 152, an alarm unit 153, a haptic module 154, and the like. In more detail, the display unit 151 can display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

Also, when the display unit 151 and the touch pad form an interlayer structure to constitute a touch screen, the display unit 151 may be used as an input device in addition to an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display. Some of those displays may be configured with a transparent type to allow viewing of the exterior through the display unit, which may be called transparent displays. An example of the typical transparent displays may include a transparent LCD (TOLED), and the like.

The display unit 151 may also be implemented in two or more in number according to a configured aspect of the mobile terminal 100. For example, an external display unit and an internal display unit may be simultaneously provided on the mobile terminal 100. The touch screen may be configured to detect a touch input pressure as well as a touch input position and area.

In addition, the audio output module 152 can output audio data received from the wireless communication unit 110 or stored in the memory 160, in a call-receiving mode, a call-placing mode, a recording mode, a voice recognition mode, a broadcast reception mode, and so on. The audio output module 152 can also output audio signals relating to functions performed in the portable terminal 100, e.g., sound alarming a call received or a message received, and so on. The audio output module 152 may include a receiver, a speaker, a buzzer, and so on.

Further, the alarm 153 outputs signals notifying occurrence of events from the portable terminal 100. The events occurring from the mobile terminal may include a call received, message received, key signal input, touch input, and so on. The alarm 153 may output not only video or audio signals, but also other types of signals such as signals notifying occurrence of events in a vibration manner. When a call signal or message is received, the alarm 153 may also output a vibration to notify this. Otherwise, when a key signal is input, the alarm 153 may output a vibration as a feedback to the input key signal. Through the foregoing vibration output, the user can recognize an event occurrence. The signal for notifying an event occurrence may be also output through the display unit 151 or the audio output module 152.

In addition, the memory 160 can store a program for processing and controlling of the controller 180, and/or temporarily store input/output data (e.g., phonebook data, messages, still images, video and the like). Also, the memory 160 can store data related to various patterns of vibrations and audio output upon a touch input on the touch screen. Further, the memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may manage a web storage which performs a storage function of the memory 160 on the Internet.

In addition, the controller 180 controls an overall operation of the portable terminal 100. For example, the controller 180 performs the control and processing associated with telephone calls, data communications, video calls, and the like. Furthermore, in FIG. 1, the controller 180 includes a multimedia module 181 for reproducing multimedia files. The multimedia module 181 may be implemented in the controller 180, or may be implemented separately from the controller 180. The controller 180 can also perform a pattern recognition processing so as to recognize handwriting or drawing input performed on the touch screen as a text or image.

Further, the power supply unit 190 provides power used by various components under the control of the controller 180. The provided power may be internal power, or external power thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some circumstances, such embodiments are implemented by the controller 180.

For a software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The mobile terminal 100 as illustrated in FIG. 1 may be configured to be operated in a communication system capable of transmitting data via frames or packets including a wireless or wired communication system and a satellite-based communication system. For example, FIG. 2 illustrates a communication system in which the mobile terminal 100 is operable.

A communication system may use different wireless interfaces and/or physical layers. For example, a wireless technique that can be used by a communication system may include Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), and the like. Hereinafter, for the sake of convenience of explanation, the description will refer to CDMA. However, the present invention may be applicable to all kinds of communication systems including the CDMA wireless communication system.

Figure 2:
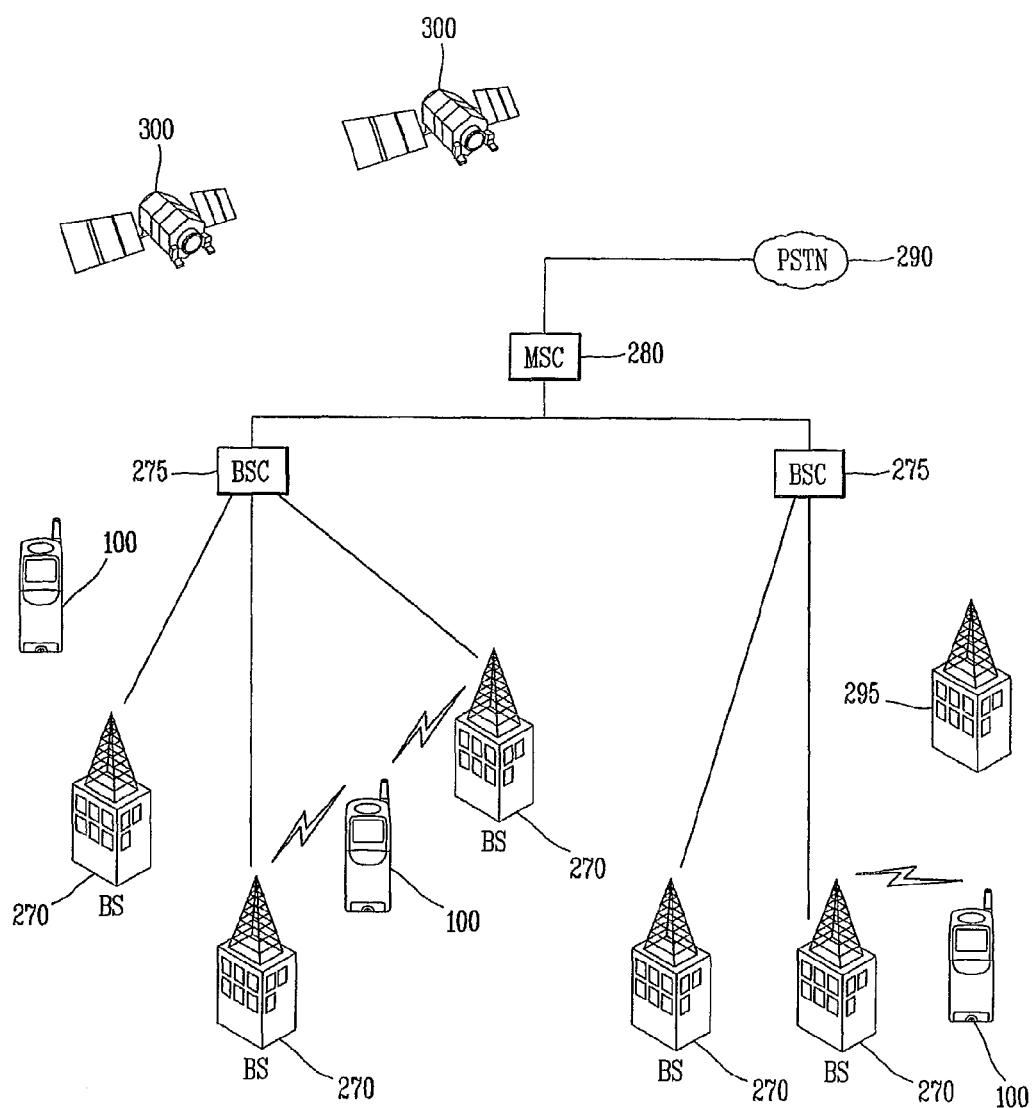
FIG. 2 is a block diagram of a radio communications system where the mobile terminal of the present invention is operable.

As illustrated in FIG. 2, the CDMA communication system includes a plurality of terminals 100, a plurality of base stations (BSs) 270, a plurality of base station controllers (BSCs) 275, and a mobile switching center (MSC) 280. The MSC 280 is configured to be connected to a public switched telephone network (PSTN) 290, and also configured to be connected to BSCs 275. The BSCs 275 may be connected to BSs 270 in pairs through a backhaul line. The backhaul line may be provided with at least one of E1/T1, ATM, IP, PPP, Frame Relay, HDSL, ADSL, and xDSL. Accordingly, a plurality of BSCs 275 may be included in a system as illustrated in FIG. 2.

Each BS 270 may include at least one sector, and each sector may include an omni-directional antenna or an antenna directing a specific radial direction from the BS 270. Alternatively, each sector may include two or more antennas in various shapes. Each BS 270 may also be configured to support allocation of a plurality of frequencies in which each frequency allocation has a specific spectrum (for example, 1.25 MHz, 5 MHz, etc.).

An intersection between the sector and the frequency allocation may be referred to as a CDMA channel. The BSs 270 may also be referred to as Base Station Transceiver Subsystems (BTSs). In this instance, the term "base station" may refer to a combination of one BSC 275 and at least one BS 270. The base station may also designate a "cell site". Alternately, each of the sectors with respect to a specific BS 270 may be referred to as a plurality of cell sites.

As illustrated in FIG. 2, a Broadcasting Transmitter (BT) 295 serves to transmit a broadcast signal to the terminals 100 operating in the system. The broadcast receiving module 111 illustrated in FIG. 1 is provided in the terminal 100 so as to receive the broadcast signal transmitted by the BT 295.

Moreover, FIG. 2 illustrates several Global Positioning System (GPS) satellites 300. The satellites 300 serve to detect the position of at least one of the multiple terminals 100. Two satellites are illustrated in FIG. 2; however, useful position information may be obtained by more or fewer than two satellites. The GPS module 115 illustrated in FIG. 1 cooperates with the satellites 300 so as to obtain desiring position information. Here, the module 115 can track the position using all techniques allowed to track positions, as well as the GPS tracking technology. Also, at least one of the GPS satellites 300 may handle satellite DMB transmission alternatively or additionally.

Among typical operations of a wireless communication system, the BS 270 serves to receive reverse link signals from various terminals 100. At this time, the terminal 100 is connecting a call, transmitting and/or receiving a message or executing other communication operations. Each reverse link signal received by a specific base station 270 is processed within the specific BS 270. Data generated resulting from the processing is transmitted to the connected BSC 275. The BSC 275 serves to allocate a call resource and manage mobility, including systemization of soft handoffs between the BSs 270. Also, the BSC 275 transmits the received data to the MSC 280, and then the MSC 280 provides an additional transmission service so as to be connected to a PSTN 290. Similarly, the PSTN 290 is connected to the MSC 280 and the MSC 280 is connected to the BSCs 275, and the BSCs 275 controls the BSs 270 so as to transmit forward link signals to the terminals 100.

Figure 3:
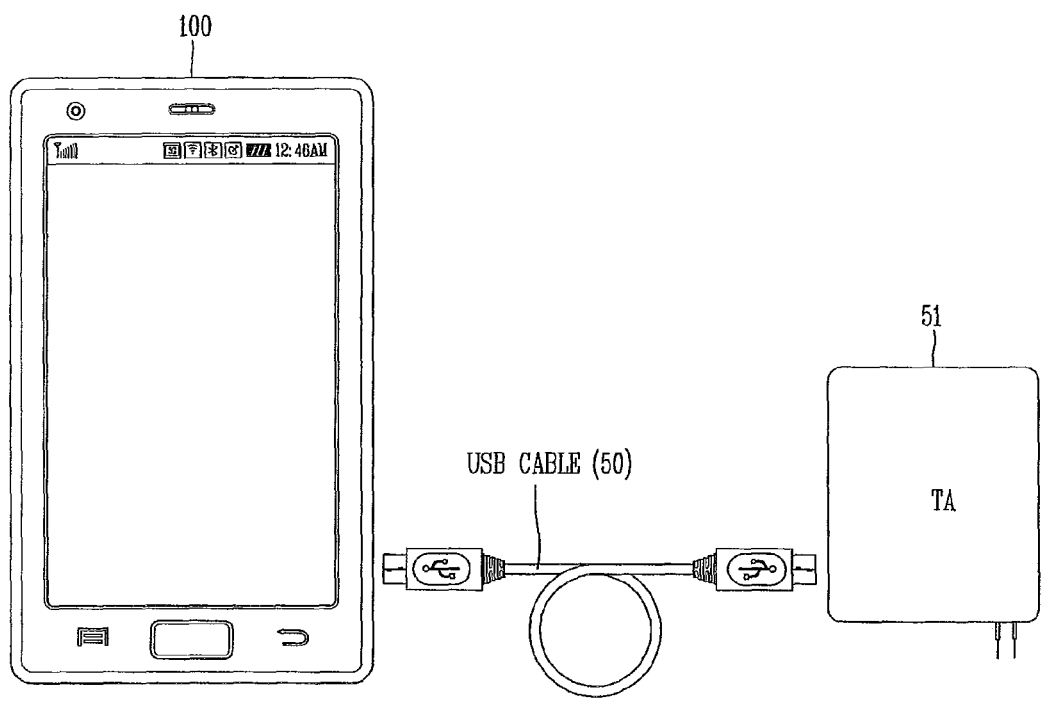
FIG. 3 is an overview showing a structure to charge a mobile terminal using a USB dedicated charger.

Next, FIG. 3 is an overview showing a structure for charging the mobile terminal 100 according to an embodiment of the present invention. As shown in FIG. 3, the mobile terminal 100 is connected to a charger (TA) 51 through a USB cable 50 during a charging operation. The controller 180 also determines a type of the TA 51, thereby setting a proper charging current (this will be described in more detail later).

Figure 4:
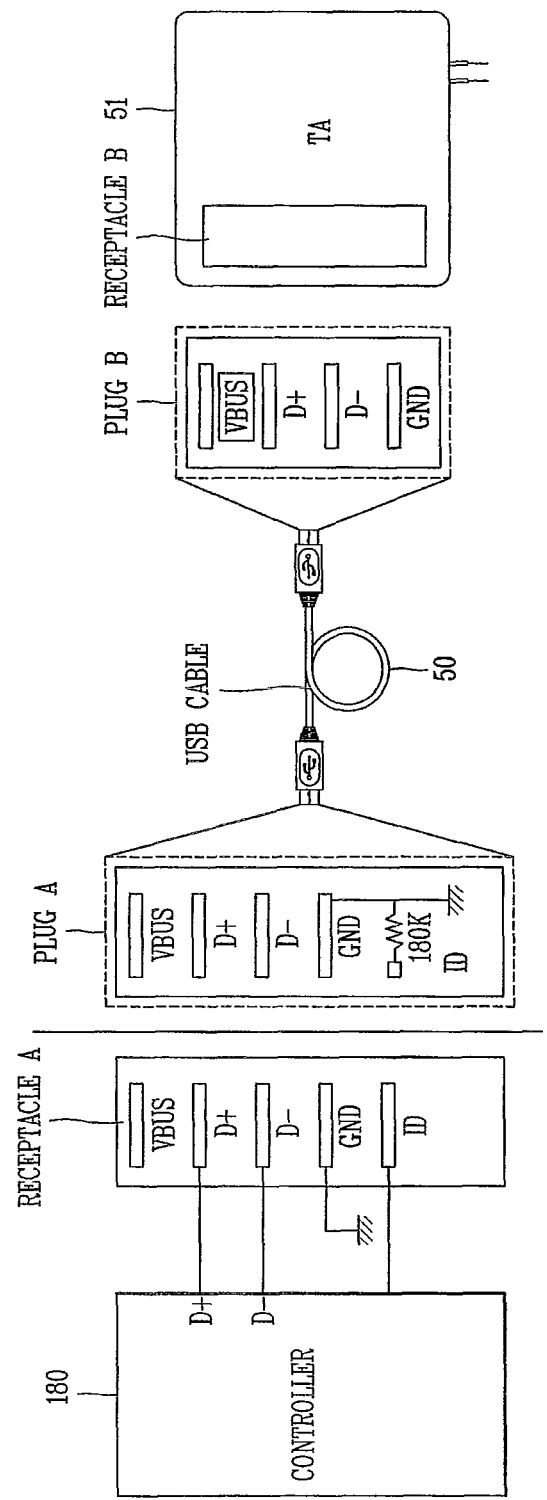
FIG. 4 is a detailed view showing the structure of FIG. 3.

FIG. 4 is a detailed view showing the charging structure for the mobile terminal 100 of FIG. 3. Referring to FIG. 4, a receptacle A of the mobile terminal 100 includes Vbus, D−, D+, ID and a ground pin. The mobile terminal 100 is also connected to the TA 51 through the USB cable 50 having plugs A and B attached to two sides thereof. In this instance, the plug A of the USB cable 50 is connected to the receptacle A of the mobile terminal, and the plug B of the USB cable 50 is connected to a receptacle B of the TA 51. As shown, the plug A includes Vbus, D−, D+, ID and a ground pin corresponding to the receptacle A. Each of the plug B and the receptacle B includes Vbus, D−, D+ and a ground pin.

Further, the pin (ID) of the receptacle A of the mobile terminal 100 is connected to a pin (or terminal) of the controller 180, and a resistance of 180 kΩ or 220 kΩ is connected to the pin (ID) of the plug A. The data pins (D+, D−) of the receptacle B of the TA 51 also include short circuits.

In the related art, a resistance type (180 kΩ or 220 kΩ) connected to the pin (ID) of the plug A was checked, thereby identifying the type (1 A or 700 mA) of the charger. Then, the mobile terminal was charged with a charging current (600 mA or 800 mA).

Figure 5:
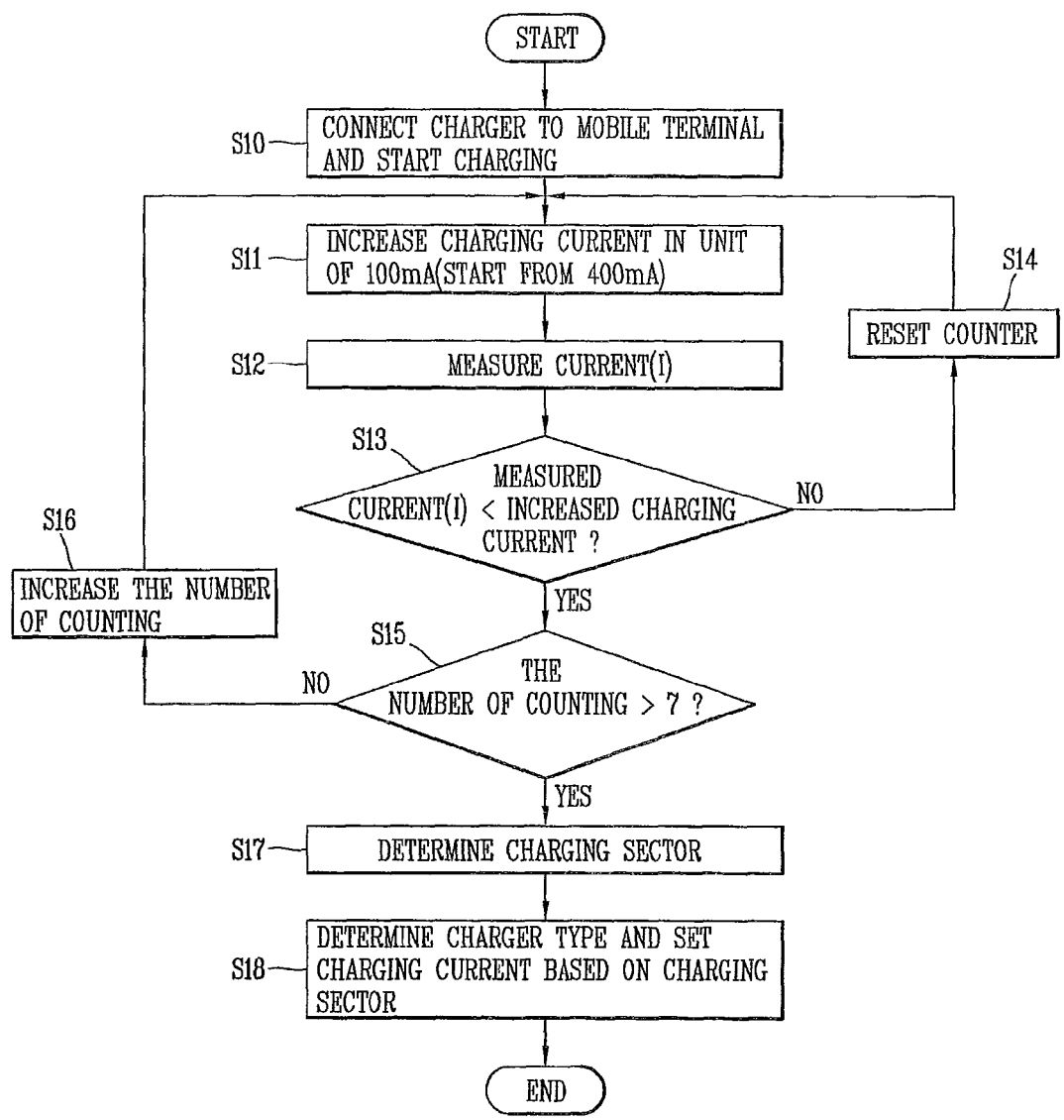
FIG. 5 is a flowchart showing a dedicated charger determining method of a mobile terminal according to an embodiment of the present invention.

However, FIG. 5 is a flowchart showing a USB dedicated charger determining method of the mobile terminal 100 according to an embodiment of the present invention. As shown in FIG. 5, once the TA 51 (a USB dedicated charger) is connected to the mobile terminal 100 through the USB 50, the controller 180 increases a charging current in a unit of 100 mA. That is, the TA 51 generally has a charging capacity of 1 A or 700 mA, and other manufacturers' chargers also have similar capacities. Accordingly, in one embodiment of the present invention, the charging current is increased from 400 mA in a unit of 100 mA for convenience (S11).

When the charging current has been initially set as 400 mA, the controller 180 measures a charging current (I) applied to the mobile terminal 100 after 0.5 seconds, for example (S12). Then, the controller 180 compares the measured charging current (I) (hereinafter, will be referred to as 'measured current') with the charging current of 400 mA (S13). The measured current (I) is a current applied to the mobile terminal 100 by the charging current.

If the measured current (I) is larger than the increased charging current (400 mA) (NO in S13), a counter is reset (S14). Then, the charging current is increased to 500 mA from 400 mA, and the steps (S12~S14) are repeatedly performed. If the increased charging current (400 mA) becomes larger than the measured current (I) (YES in S13), the controller 180 checks whether the charging current is larger than the measured current (I) for a predetermined time, about 3.5 seconds (the number of count times is 7). This checking process is performed through S15 and S16.

If the increased charging current is larger than the measured current (I) for a predetermined time as a result of the checking process, the controller 180 determines a present charging sector. Then, the controller 180 sets a charging capacity (charging current according to a charger type) suitable for the charger according to the determined charging sector (S17 and S18).

Figure 6:
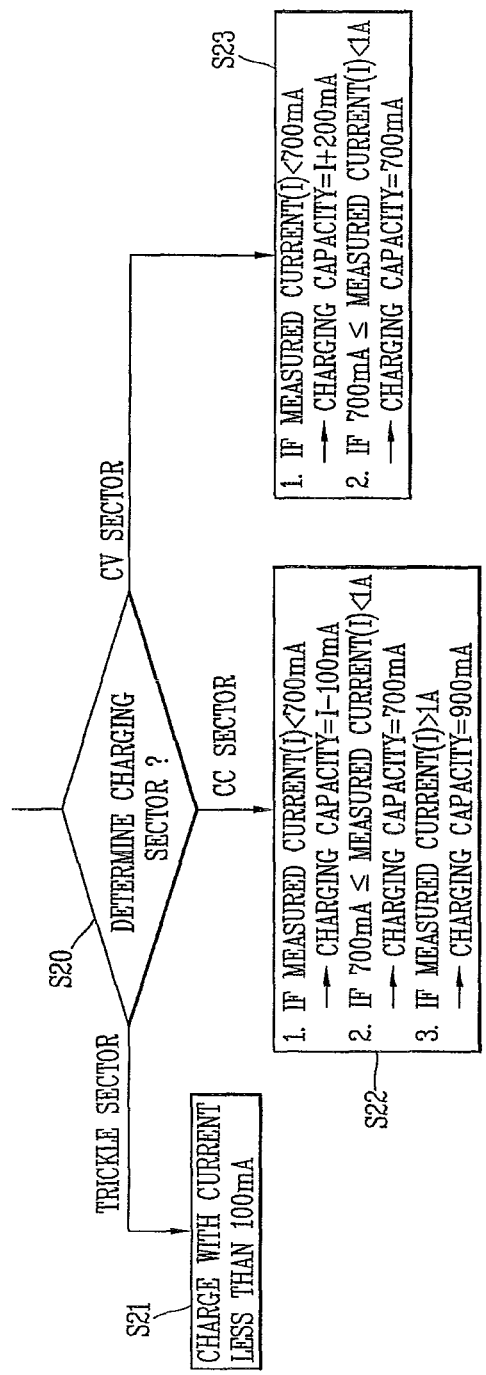
FIG. 6 is a flowchart showing a method for determining a charging capacity of a charger according to a charging sector according to an embodiment of the present invention.
Figure 7:
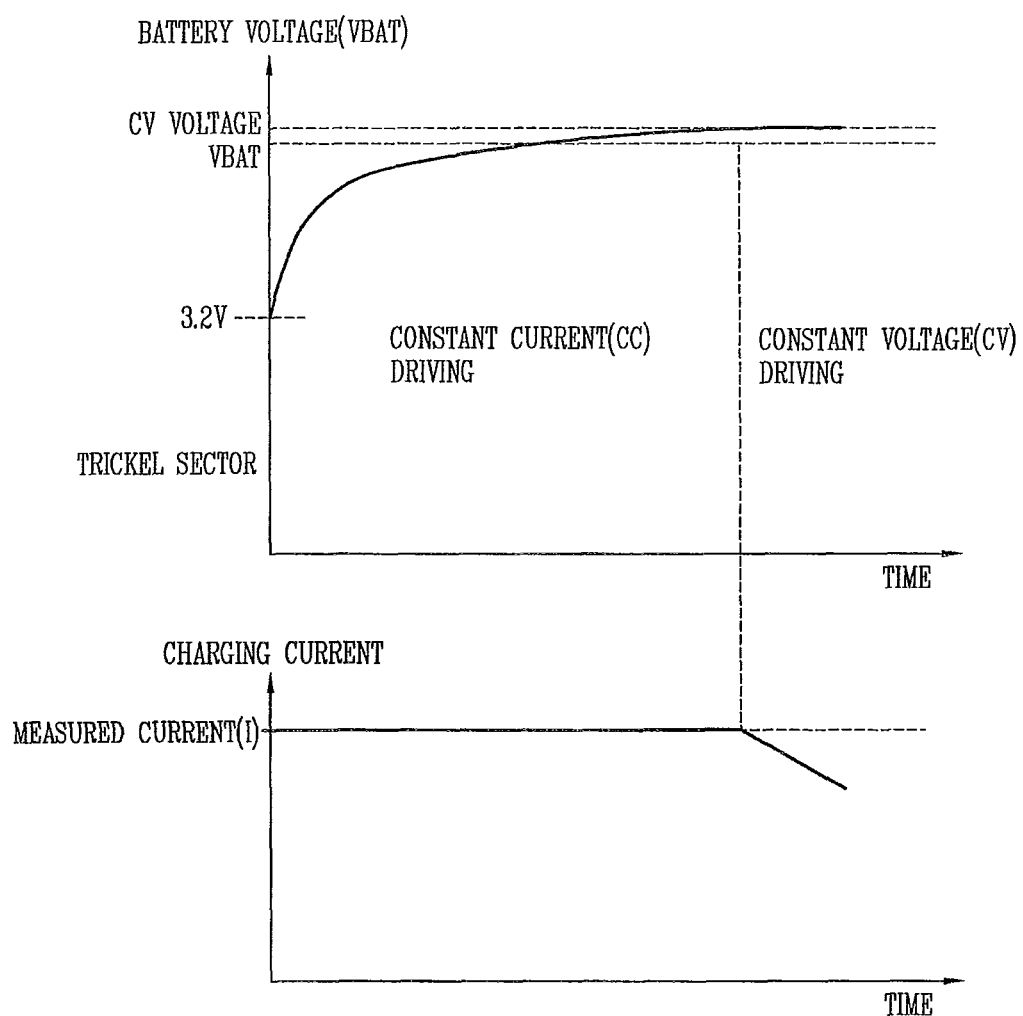
FIGS. 7 and 8 are graphs showing changes of a battery voltage and a charging current at a constant current sector and a constant voltage sector according to an embodiment of the present invention.
Figure 8:
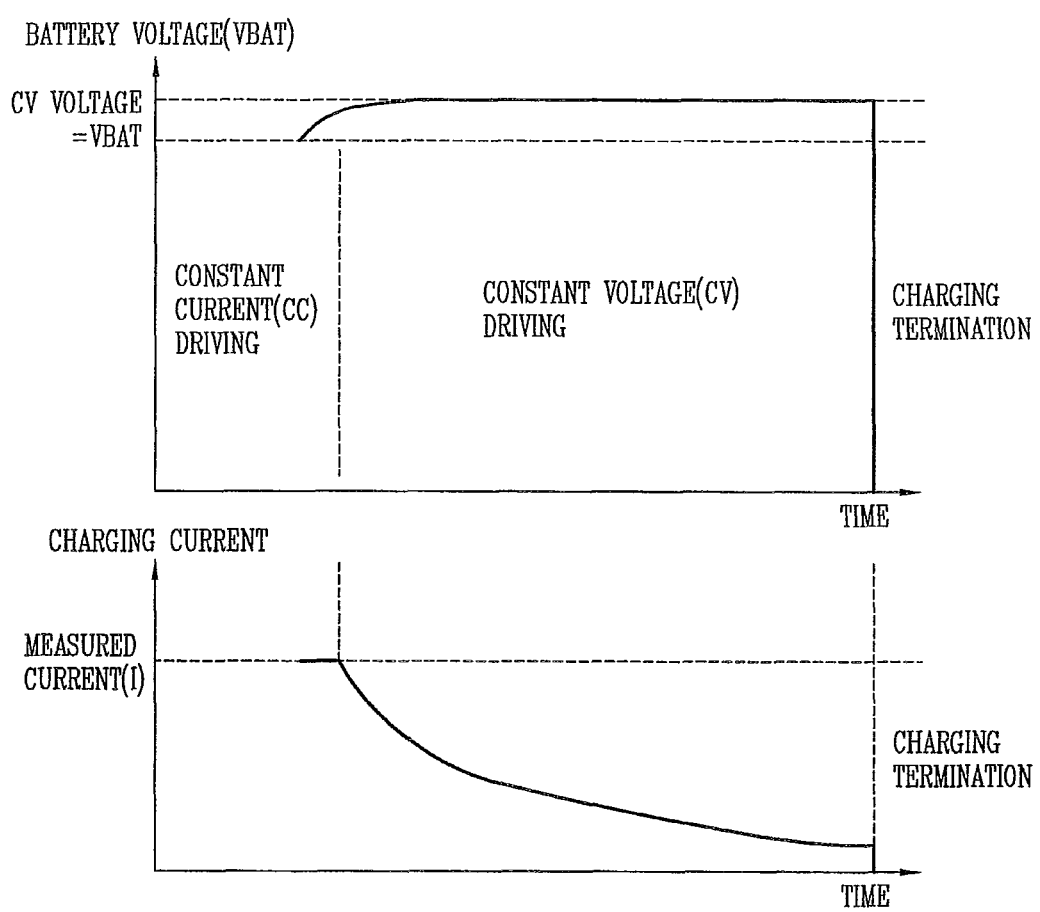

Next, FIG. 6 is a flowchart showing a method for determining a charging capacity of a charger according to a charging sector, and FIGS. 7 and 8 are graphs showing changes of a battery voltage (VBAT) and a charging current at a constant current (CC) sector and a constant voltage (CV) sector. In more detail, if the increased charging current is larger than the measured current (I) for a predetermined time in FIG. 5, the controller 180 determines a present charging sector as shown in FIG. 6 (S20).

The charging sector may be categorized into a trickle sector, a constant current (CC) sector, and a constant voltage (CV) sector. The trickle sector indicates a sector of FIG. 7 where a battery voltage (VBAT) is less than 3.2V. In the trickle sector, the controller 180 does not set an additional charging current as a charging capacity of the charger, but charges the mobile terminal with a current less than 100 mA.

As shown in FIG. 7, the CC sector indicates a sector where the battery voltage (VBAT) is smaller than a constant voltage (CV), but equal to or larger than 3.2V. Because the mobile terminal 100 supplies a charging current to the battery with a high intensity, the measured current (I) is larger than the charging capacity by about 10~20%. Accordingly, at the CC sector, the charging capacity of the charger has to be set as a value smaller than the measured current (I) by about 100 mA~200 mA.

When a present charging sector is a CC sector, the controller 180 compares the measured current (I) with the charging capacity (700 mA and 1 A) of the charger by the following equation (1), thereby calculating a charging capacity suitable for the connected charger (S22).

$$\text{Charging capacity} = I - 100 \text{ mA, if } I < 700 \text{ mA} \quad \text{Formula (1)}$$
$$= 700 \text{ mA, if } 700 \text{ mA} \le I < 1A)$$
$$= 900 \text{ mA, if } I > 1A$$

For instance, when the measured current (I) is less than 700 mA, a charging capacity is set as a value obtained by subtracting 100 mA (or 200 mA) from the measured current (I) (a charger of 35 mA with regard to another manufacturers' products). When the measured current (I) is in the range of 700 mA~1 A (700≤I<1000), a charging capacity is set as 700 mA (TA of 700 mA is currently connected to the mobile terminal) (S21). When the measured current (I) is more than 1 A, a charging capacity of the charger is set as 900 mA (TA of 1 A is currently connected to the mobile terminal).

As shown in FIG. 8, the CV sector indicates a sector where a battery voltage (VBAT) is equal to or larger than a constant voltage (CV). At this sector, a current amount is small (because a charging current is not supplied to the battery) and a battery voltage (VBAT) is comparatively high. Accordingly, the charging capacity of the charger has to be set as a value larger than the measured current (I) by 100 mA~200 mA.

At the CV sector, the controller 180 compares the measured current (I) with the charging capacity (700 mA and 1 A) of the charger based on the following formula (2), thereby calculating a charging capacity of the charger currently connected to the mobile terminal (S23).

$$\text{Charging capacity} = I + 200 \ mA, \text{ if } I < 700 \text{ mA} \quad \text{Formula (2)}$$
$$= 700 \text{ mA, if } 700 \text{ mA} \leq I < 1A)$$

More concretely, when the measured current (I) is less than 700 mA, the controller 180 sets a charging capacity as a value obtained by adding 200 mA to the measured current (I). When the measured current (I) is in the range of 700 mA~1 A (700≤I<1000), the controller 180 sets a charging capacity as 700 mA (TA of 700 mA is currently connected) (S23).

When a present charging sector is a trickle sector which corresponds to neither the CC sector nor the CV sector in S20, the controller 180 does not set an additional charging capacity of the charger, but charges the charger with a current less than 100 mA.

Figure 9:
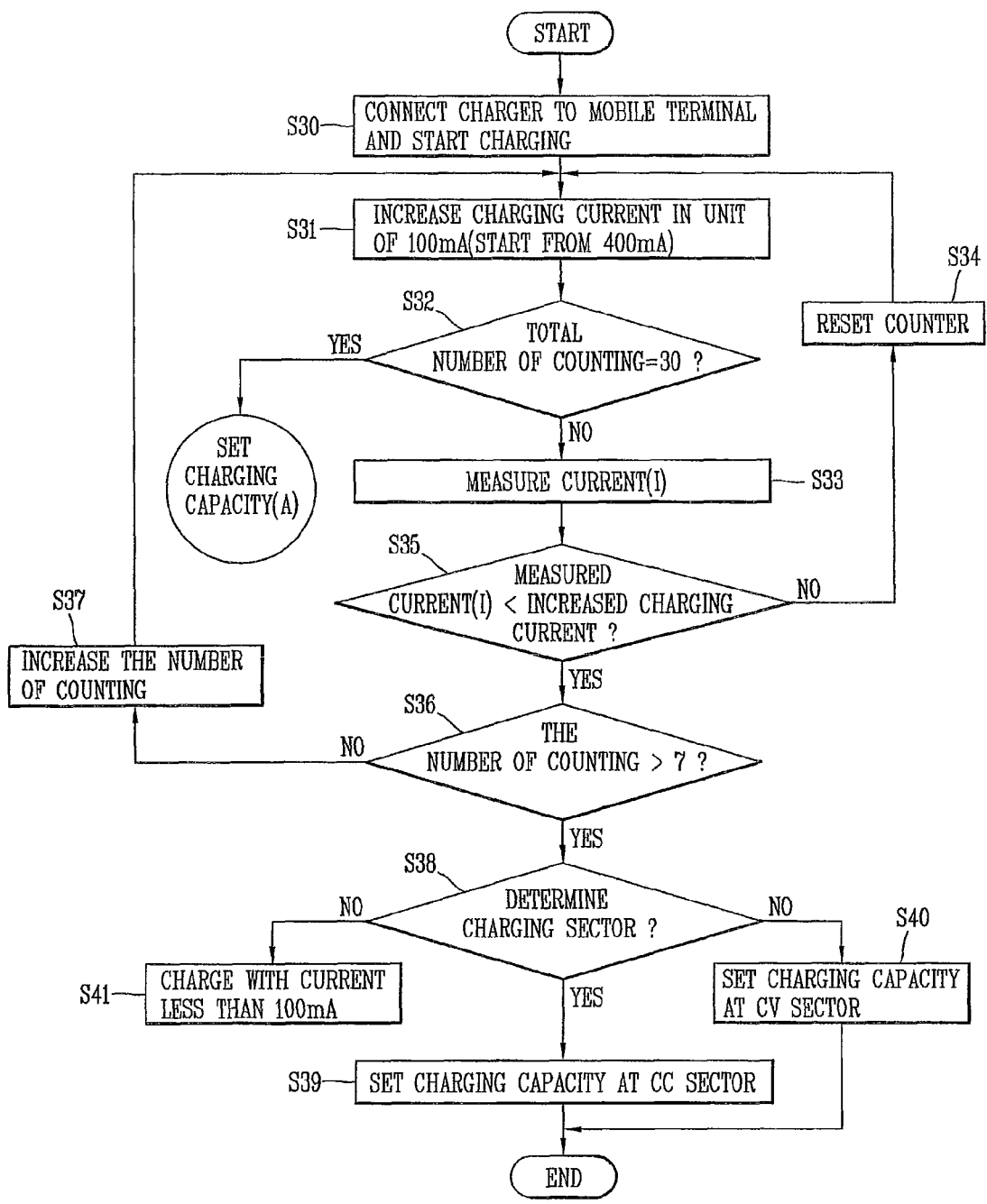
FIG. 9 is a flowchart showing a method for setting a charging capacity of a charger when supplying a charging current more than a charging capacity of the charger to a mobile terminal according to an embodiment of the present invention.

Next, FIG. 9 is a flowchart showing a method for stably setting a charging capacity of a charger when supplying a charging current more than a charging capacity of the charger to the mobile terminal according to an embodiment of the present disclosure.

When a charging current more than a charging capacity is supplied to the mobile terminal, e.g., when a charger (TA) of 700 mA is connected to a smart phone preset to be charged with 1 A, the controller 180 supplies a charging current of 1 A. As a result, overload occurs on the charger. This may cause the charging current to be instantaneously decreased, thereby resulting in an irregular charging current.

Accordingly, while increasing the charging current from 400 mA to 1 A in a unit of 100 mA, the controller 180 counts the number of times that each increased charging current is larger than the measured current (I). Then, once a total count number with respect to the respective charging currents is 30, the controller 180 sets a charging current having the largest number of times as a charging capacity of the charger. This operation is performed through S30-S37.

More concretely, the number of times that the charging current of 400 mA is larger than the measured current (I) is counted (S31, S32, S33 and S35-S37). Then, if the measured current (I) is larger than the charging current of 400 mA, a counter is reset (S34). Then, the number of times that the charging current of 500 mA is larger than the measured current (I) is counted. In the same manner, the number of times that a corresponding charging current is larger than the measured current (I) is counted. If a total count number is 30 or the total count number reaches 30 before 1 A, the controller 180 sets a charging current having the largest number of times as a charging capacity of the charger. If the measured current (I) is larger than a specific increased charging current for a predetermined time (the total count number is 7), S39~S41 corresponding to S20~S2 of FIG. 6 are performed.

Figure 10:
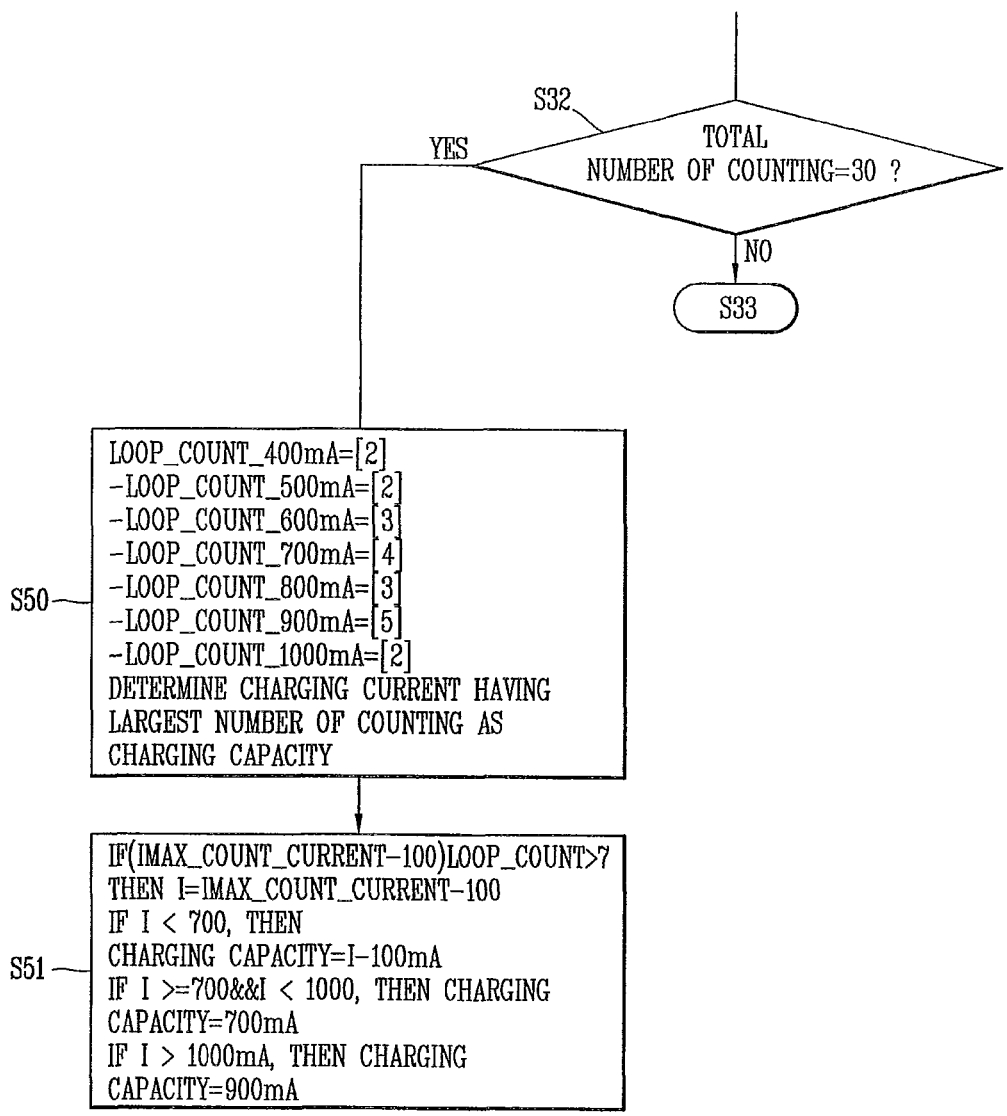
FIG. 10 is a flowchart showing a method for setting a charging current having a largest count number among respective increased charging currents of FIG. 9 as a charging capacity of a charger.

Next, FIG. 10 is a flowchart showing a method for setting a charging current having a largest count number among respective increased charging currents of FIG. 9 as a charging capacity of a charger. As shown in FIG. 10, S31, S32, S33 and S35-S37 shown in FIG. 9 are performed, thereby counting the number of times that a corresponding charging current is larger than the measured current (I). Then, the controller 180 checks whether a total count number is 30 (S50). If the total count number is 30, the controller 180 sets 900 mA having the largest count number of 5 as a charging capacity of the charger.

Here, if a count number of a charging current obtained by subtracting 100 mA from the maximum charging current (Imax_count_current, 900 mA in FIG. 10) is more than 7, i.e., if 800 mA is larger than the measured current (I) for 3.5 seconds or more, the measured current (I) is determined by the following formula (3) (S51).

$$\text{Measured current } (I)=I\text{max\_count\_current}-100 \text{ mA} \quad \text{Formula (3)}$$

Once a precise measured current is determined, the controller 180 finally calculates a charging capacity of the charger by the following formula (4).

$$\text{Charging capacity} = I - 100 \text{ mA, if } I < 700 \text{ mA} \quad \text{Formula (4)}$$
$$= 700 \text{ mA, if } 700 \text{ mA} \leq I < 1A)$$
$$= 900 \text{ mA, if } I > 1A$$

In the present invention, when a current amount is irregular as a charging current more than a charging capacity is supplied, a charging current having the largest count number for a predetermined time (about 15 seconds=total count number of 30) is set as a charging capacity of the charger. Here, the charging current having the largest count number for a predetermined time indicates a charging current which has maintained a higher state than the measured current (I) for a longest time.

As aforementioned, in an embodiment of the present disclosure, a charging current is increased in a unit of 100 mA after connecting the charger to the mobile terminal. Then, if an increased charging current is larger than a measured current for a predetermined time, a present charging sector is determined to finally determine a charging capacity of the charger.

Accordingly, a charging capacity of the USB dedicated charger (TA) may be obtained without measuring a resistance of a USB ID terminal. This reduces the fabrication costs because a USB ID is not required. Furthermore, not only a charging capacity of the TA having 700 mA and 1 A, but also a charging capacity of other manufacturer's TA may be easily obtained. That is, the present invention may be applied to the entire models using a TA.

In the related art, it is difficult to calculate a charging capacity of a charger when a USB cable having no resistance is connected to a USB ID terminal. Accordingly, the related charger (TA) of 1 A includes a charging current of 800 mA with consideration of compatibility with 700 mA, and the related art charger (TA) of 700 mA includes a charging current of 600 mA with consideration of compatibility with 500 mA.

However, in an embodiment of the present invention, a proper charging capacity of a TA having various capacities can be easily obtained. Accordingly, a charger (TA) of 1 A includes a charging current of 900 mA, and a charger (TA) of 700 mA includes a charging current of 700 mA. This shortens a charging time more than in the conventional art. Thus, the present inventions solves a problem in the related art in that there was no method for checking which type of TA is connected to a mobile terminal when a USB plug having no resistance is connected to an ID pin.

The aforementioned method may be implemented as a program code stored in a computer-readable storage medium. The storage medium may include ROM, RAM, CD-ROM, a magnetic tape, a floppy disc, an optical data storage device, etc. Also, the storage medium may be implemented using the Internet. The computer may include the controller 180 of the mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of determining a charger of a mobile terminal, the method comprising:
    receiving, via a controller of the mobile terminal, a connection signal indicating the charger is connected to the mobile terminal;
    setting, via the controller, a charging current of the charger for charging the mobile terminal and increasing the set charging current in predetermined current units;
    measuring, via the controller, an actual current received from the charger and applied to the mobile terminal;
    comparing, via the controller, the set charging current with the measured actual current;
    determining, via the controller, a charging sector of the charger when the set charging current is larger than the measured actual current for a first predetermined amount of time; and
    calculating, via the controller, a charging current capacity of the charger using the determined charging sector.

2. The method of claim 1, wherein the charger is a Universal Serial Bus (USB) travel adaptor (TA).

3. The method of claim 1, wherein the setting step set the charging current to an initial value of 400 mA and then increments the charging current into predetermined current units of 100 mA.

4. The method of claim 1, wherein the setting step increases the charging current in the predetermined current units when the comparing step determines the set charging current is smaller than the measured actual current.

5. The method of claim 1, further comprising:
    setting the charging current capacity of the charger to be lower than or equal to the measured actual current when the determining step determines the charging sector is a constant current sector;
    setting the charging current capacity of the charger to be higher than or equal to the measured actual current when the determining step determines the charging sector is a constant voltage sector; and
    not setting the charging capacity of the charger when the determining step determines the charging sector is a trickle sector.

6. The method of claim 5, wherein the trickle sector comprises performing a charging operation only when a battery of the mobile terminal has a voltage lower than a predetermined threshold, and charging the battery of the mobile terminal with a charging current less than 100 mA.

7. The method of claim 5, wherein when the measured current at the constant current sector is less than 700 mA, the setting step sets the charging capacity to be lower than the measured current by 100~200 mA,
    wherein when the measured current is in the range of 700 mA~1 A, the setting step sets the charging capacity to be 700 mA, and
    wherein when the measured current is more than 1 A, the setting step sets the charging capacity to be 900 mA.

8. The method of claim 5, wherein when the measured current at the constant voltage sector is less than 700 mA, the setting step sets the charging capacity to be higher than the measured current by 100~200 mA, and
    wherein when the measured current is in the range of 700 mA~1 A, the setting step sets the charging capacity to be 700 mA.

9. The method of claim 1, further comprising:
    counting a number of times that each of the set charging currents is greater than the measured current while the set charging current is increased in the predetermined current units for a prescribed number of times; and
    setting a corresponding charging current that occurs a largest number of times in the counted number of times as the charging capacity.

10. A mobile terminal, comprising:
    a wireless communication unit configured to wirelessly communicate with at least one other entity;
    an interface configured to receive a connection signal indicating a charger is connected to the mobile terminal; and
    a controller configured to set a charging current of the charger for charging the mobile terminal and increase the set charging current in predetermined current units, to measure an actual current received from the charger and applied to the mobile terminal, to compare the set charging current with the measured actual current, to determine a charging sector of the charger when the set charging current is larger than the measured actual current for a first predetermined amount of time, and to calculate a charging current capacity of the charger using the determined charging sector.

11. The mobile terminal of claim 10, wherein the charger is a Universal Serial Bus (USB) travel adaptor (TA).

12. The mobile terminal of claim 10, wherein the controller is further configured to set the charging current to an initial value of 400 mA and then increment the charging current into predetermined current units of 100 mA.

13. The mobile terminal of claim 10, wherein the controller is further configured to increase the charging current in the predetermined current units when the set charging current is determined to be smaller than the measured actual current.

14. The mobile terminal of claim 10, wherein the controller is further configured to set the charging current capacity of the charger to be lower than or equal to the measured actual current when the charging sector is determined to be a constant current sector, to set the charging current capacity of the charger to be higher than or equal to the measured actual current when the charging sector is determined to be a constant voltage sector, and not to set the charging capacity of the charger when the charging sector is determined to be a trickle sector.

15. The mobile terminal of claim 14, wherein the trickle sector comprises performing a charging operation only when a battery of the mobile terminal has a voltage lower than a predetermined threshold, and charging the battery of the mobile terminal with a charging current less than 100 mA.

16. The mobile terminal of claim 14, wherein when the measured current at the constant current sector is less than 700 mA, the controller is further configured to set the charging capacity to be lower than the measured current by 100~200 mA, wherein when the measured current is in the range of 700 mA~1 A, the controller is further configured to set the charging capacity to be 700 mA, and wherein when the measured current is more than 1 A, the controller is further configured to set the charging capacity to be 900 mA.

17. The mobile terminal of claim 14, wherein when the measured current at the constant voltage sector is less than 700 mA, the controller is further configured to set the charging capacity to be higher than the measured current by 100~200 mA, and wherein when the measured current is in the range of 700 mA~1 A, the controller is further configured to set the charging capacity to be 700 mA.

18. The mobile terminal of claim 10, wherein the controller is further configured to count a number of times that each of the set charging currents is greater than the measured current while the set charging current is increased in the predetermined current units for a prescribed number of times, and to set a corresponding charging current that occurs a largest number of times in the counted number of times as the charging capacity.

* * * * *